US012611743B2

(12) United States Patent
Röders

(10) Patent No.: US 12,611,743 B2
(45) Date of Patent: Apr. 28, 2026

(54) HANDLING ASSEMBLY OF A MACHINE TOOL

(71) Applicant: P&L GMBH & CO. KG, Soltau (DE)

(72) Inventor: Jürgen Röders, Soltau (DE)

(73) Assignee: P&L GMBH & CO. KG, Soltau (DE)

( * ) Notice: Subject to any disclaimer, the term of this patent is extended or adjusted under 35 U.S.C. 154(b) by 447 days.

(21) Appl. No.: 18/261,447

(22) PCT Filed: Nov. 25, 2021

(86) PCT No.: PCT/EP2021/083003
§ 371 (c)(1),
(2) Date: Jul. 13, 2023

(87) PCT Pub. No.: WO2022/152444
PCT Pub. Date: Jul. 21, 2022

(65) Prior Publication Data
US 2024/0316708 A1     Sep. 26, 2024

(30) Foreign Application Priority Data

Jan. 13, 2021     (DE) .................... 10 2021 100 556.6

(51) Int. Cl.
| | |
|---|---|
| *B23Q 3/155* | (2006.01) |
| *B23Q 1/48* | (2006.01) |
| *B23Q 7/04* | (2006.01) |
| *B25J 9/02* | (2006.01) |
| *B25J 9/04* | (2006.01) |

(52) U.S. Cl.
CPC ......... *B23Q 3/1554* (2013.01); *B23Q 1/4833* (2013.01); *B23Q 1/4861* (2013.01);
(Continued)

(58) Field of Classification Search
CPC .. B23Q 3/1554; B23Q 1/4833; B23Q 1/4861; B23Q 1/4871; B23Q 7/04; B23Q 2003/155404; B25J 9/023; B25J 9/047
See application file for complete search history.

(56) References Cited

U.S. PATENT DOCUMENTS

| | | | |
|---|---|---|---|
| 7,179,043 B2 * | 2/2007 | Jager ...................... | B23Q 1/623 |
| | | | 901/6 |
| 7,476,072 B2 * | 1/2009 | Tamura .................... | B25J 9/023 |
| | | | 269/58 |

(Continued)

FOREIGN PATENT DOCUMENTS

| | | |
|---|---|---|
| CN | 103056874 A | 4/2013 |
| DE | 3440604 A1 | 5/1986 |

(Continued)

OTHER PUBLICATIONS

International Search Report and Written Opinion for Application No. PCT/EP2021/083003 dated Feburary 23, 2022 (6 pages).

(Continued)

*Primary Examiner* — Ryan J. Walters
(74) *Attorney, Agent, or Firm* — Michael Best & Friedrich LLP

(57)     ABSTRACT

The invention relates to a handling assembly for handling tools and/or workpieces of a machine tool, comprising a horizontal rail assembly, a vertical tower movable on the horizontal rail assembly in the direction of a horizontal axis, a vertical rail assembly arranged on the tower, a vertical carriage movable on the vertical rail assembly in the vertical direction, exactly one one-piece rigid arm, arranged on the vertical carriage and swivel-mounted about a horizontal, first swivel axis on the vertical carriage, and a manipulator arranged on the arm and swivel-mounted about a horizontal, second swivel axis on the arm, wherein the arm is swivel-mounted about a vertical swivel axis, wherein the first swivel axis is parallel to the second swivel axis, and wherein the first swivel axis is arranged on a first side of the vertical swivel axis in a first distance from the vertical swivel axis.

17 Claims, 16 Drawing Sheets

(52) U.S. Cl.
CPC ............. *B23Q 1/4871* (2013.01); *B23Q 7/04* (2013.01); *B25J 9/023* (2013.01); *B25J 9/047* (2013.01); *B23Q 2003/155404* (2016.11)

(56) References Cited

U.S. PATENT DOCUMENTS

| | | | | |
|---|---|---|---|---|
| 8,240,971 | B2 * | 8/2012 | Sandmeier | ............... B25J 9/041 |
| | | | | 901/17 |
| 11,014,228 | B2 * | 5/2021 | Tian | ........................... B25J 9/12 |
| 11,167,408 | B2 * | 11/2021 | Thomas | ................... B25J 9/023 |
| 2005/0019145 | A1 | 1/2005 | Jager | |
| 2005/0196263 | A1 | 9/2005 | Tamura | |

FOREIGN PATENT DOCUMENTS

| | | | |
|---|---|---|---|
| DE | 19510498 | A1 | 9/1996 |
| DE | 19642042 | A1 | 4/1998 |
| EP | 0282417 | A1 | 9/1988 |
| EP | 1481759 | A2 | 12/2004 |
| EP | 1607174 | A1 | 12/2005 |
| JP | H03184783 | A | 8/1991 |
| JP | H08162515 | A | 6/1996 |
| JP | H09193054 | A | 7/1997 |
| JP | 3115497 | U | 11/2005 |
| JP | 2012223861 | A | 11/2012 |

OTHER PUBLICATIONS

Chinese Patent Office Action for Application No. 202180090257.9 dated Jun. 11, 2025 (16 pages including English machine translation).

Japanese Patent Office Notice of Reasons for Refusal for Application No. 2023-541846 dated Oct. 11, 2024 (14 pages with English machine translation).

* cited by examiner

Fig. 11

HANDLING ASSEMBLY OF A MACHINE TOOL

FIELD OF THE INVENTION

The invention relates to a handling assembly for handling tools and/or workpieces of a machine tool, as well as a machine tool assembly.

BACKGROUND OF THE INVENTION

Handling assemblies are used for automating the loading of machine tools with workpieces and for tool replacement. For example, this may be performed by means of 6-axis robots, which, however, are subject to high maintenance costs in addition to high investment costs. Alternatively, it is known to use more simple handling assemblies instead of 6-axis robots, which travel longitudinally on a rail in front of the machine tool to feed workpieces into the machine tool for machining and to remove them therefrom. These handling assemblies are usually designed such that a carriage is movable on a bottom axis along the machine tool. A rotatable tower is mounted on the carriage, on which tower a horizontally extendable telescopic arm can be moved upwards and downwards. In this way, any position can be approached in all directions using four controlled axes. Even though this design basically has proven to be effective, it requires relatively large amount of space in front of the machine tool. Another disadvantage is that all the components of the handling assembly have to be individually installed on site at a customer's premises. This results in relatively long assembly times.

SUMMARY OF THE INVENTION

It is the object of the present invention to provide a handling assembly having simple and inexpensive manufacturability, which requires very little space in front of a machine tool and can be installed at a customer's site in a quick and easy manner, as well as a machine tool assembly having such a handling assembly.

This object will be accomplished by a handling assembly having the features of claim 1 and a machine tool assembly having the features of claim 15. The subclaims show preferred further embodiments of the invention.

The handling assembly according to the invention for handling tools and/or workpieces having the features of claim 1 has the advantage that the handling assembly is designed to be very compact and simple. As a result, the handling assembly can be arranged in a confined space, for example in front of machine tools, between a shelf system and the machine tool. At the same time, the design of the handling assembly according to the invention is very cost-effective and robust. According to the invention, this will be achieved by the handling assembly comprising a horizontal rail assembly and a tower, which can be moved on the horizontal rail assembly in the direction of a horizontal axis. Furthermore, the handling assembly comprises a vertical rail assembly which is arranged on the tower. A vertical carriage is movable on the vertical rail assembly in a vertical direction. Furthermore, a single, one-piece, rigid arm without a joint or kink is provided, which is arranged on the vertical carriage and is swivel-mounted about a horizontal first swivel axis on the vertical carriage. Preferably, the arm is provided in the form of a linear bar or beam. A manipulator, in particular a gripper or one or more forks, is arranged on the arm and is swivel-mounted about a horizontal second swivel axis on the arm, the first and second swivel axes being arranged parallel to each other. Furthermore, the arm is swivel-mounted about a vertical swivel axis. Furthermore, the first swivel axis is arranged on a first side of the vertical swivel axis in a predetermined first distance from the vertical swivel axis. Preferably, the horizontal first swivel axis and the horizontal second swivel axis on the one-piece arm are each disposed near the free ends of the arm.

Preferably, the vertical swivel axis is a third swivel axis, the tower being swivel-mounted thereabout. Alternatively, the vertical swivel axis is a fourth swivel axis, the arm on the vertical carriage being swivel-mounted thereabout. Preferably, the tower is designed not to be swivel-mounted in this case. A respective swivel angle about the vertical swivel axis is preferably ≥180°. Particularly preferably, in a first end position, the second swivel axis is arranged on a second side of the vertical swivel axis in a second distance. In this way, a particularly compact position of the arm can be achieved in the first end position, since the first swivel axis is located on the first side of the vertical swivel axis and the second swivel axis is located on the opposite second side of the vertical swivel axis. Particularly preferably, the second distance is greater than the first distance. Further preferably, the first swivel axis is located between the vertical swivel axis and a rail of the vertical rail assembly on the tower.

According to another preferred embodiment of the invention, the second swivel axis in a second end position is also arranged on the second side of the vertical swivel axis in a third distance from the vertical swivel axis. Preferably, the third distance is the same as the second distance from the vertical swivel axis. As a result, a very compact position of the arm may also be realized in the second end position of the linear arm.

Particularly preferably, the one-piece arm articulated to the vertical carriage has a swivel radius of ≥180°, in particular approx. 240°. At a swivel angle of 240°, the first end position and the second end position preferably are located in a common vertical line. While swiveling from the first end position to the second end position, the second swivel axis swivels twice across the third swivel axis.

Further preferably, the vertical swivel axis intersects the arm itself in the first end position and/or the second end position of the arm. This ensures a particularly compact position of the arm on the tower in order to be able to execute a rotary motion with a very small interference circle. Further preferably, a forced coupling unit is provided, which is provided between the first and second swivel axes, wherein the forced coupling unit is arranged to keep the manipulator horizontally aligned in each swivel position of the arm. As a result, only one of the two swivel axes can be driven and control of the manipulator assembly is simplified.

Particularly preferably, the first swivel axis is driven and the second swivel axis is without its own drive. This means that the drive for the first swivel axis can be arranged on the vertical carriage and the weight of the arm together with the manipulator can be reduced.

The vertical, in particular third swivel axis is preferably also drivable. Preferably, a central axis of the tower and the third swivel axis diverge. Thus, the central axis of the tower and the third swivel axis are preferably parallel to each other, so that when the tower is swiveled, it swivels about the third vertical swivel axis at a distance, which can further improve compactness of the handling assembly.

The tower is preferably arranged on a horizontal carriage, which preferably has its own drive. When the tower is swivel-mounted about a third swivel axis, a drive of the tower is preferably arranged on the horizontal carriage.

Preferably, a base plate is further provided on which the tower is arranged. The base plate is preferably arranged rotatably on the horizontal carriage. The horizontal carriage is arranged to be movable in the horizontal direction on the horizontal rail assembly.

According to another alternative embodiment of the invention, the arm is connected to the tower, the arm being swivel-mounted about a vertical fourth swivel axis in relation to the tower. This has the advantage that the tower does not need to be swiveled. A holder preferably has first and second support plates or support arms or the like between which the arm is swivel-mounted about the first swivel axis in the horizontal direction.

Preferably, the holder comprises a third and a fourth horizontal holding plate, which are arranged on the vertical carriage. The third and fourth holding plates serve as bearings for the vertical swivel axis, the first and second holding plates together with the arm being mounted to be swiveled therearound. The forced coupling unit, which connects the first swivel axis to the second swivel axis, preferably comprises a chain drive or a belt drive. This allows cost-effective and simply designed forced coupling to be realized between the two swivel axes. At the same time, the forced coupling is also designed to be very robust.

According to a further preferred embodiment of the invention, the handling assembly further comprises a shelf system in which the workpieces and/or tools are arranged. The shelf system is preferably provided such that the tower of the handling assembly is arranged between the shelf system and a machine tool. Thus, short distances for the handling of tools and/or workpieces may be realized between the shelf system and the machine tool.

Preferably, a single handling assembly is integrated in a cabinet together with the shelf system. Particularly preferably, several cabinets and several shelf systems are provided in modular design, which are arranged adjacent to each other. Preferably, only a single handling assembly is used to serve several shelf systems and preferably also several machine tools.

Preferably, multiple shelf systems are arranged adjacent to each other in a row and connected by a common horizontal rail assembly. This allows the tower to be moved in front of the shelf systems and a variety of different tools and/or a variety of workpieces to be stored in the shelf systems. Preferably, the individual shelf systems are interconnected via mechanical interfaces, for example, openings and appropriately formed protrusions.

Particularly preferably, the shelf system and the handling assembly are arranged in a cabinet. This allows the tools and/or workpieces located in the shelf system to be protected. Preferably, the cabinet has doors to allow access from the outside. The doors are preferably arranged on the opposite side of the side on which the tower of the handling assembly is arranged.

Furthermore, the invention relates to a machine tool assembly comprising a machine tool and a handling assembly according to the invention. The handling assembly is thereby arranged in front of the machine tool. Particularly preferably, a tower of the handling assembly will thus be arranged between the machine tool and a shelf system in which tools and/or workpieces are stored. The machine tool assembly preferably comprises several machine tools, which are preferably arranged in series and can be supplied with tools and/or workpieces by a common handling assembly, and applicable exchange of tools and/or workpieces is effected.

The machine tool is preferably a metal-cutting machine, in particular a milling machine or a drilling machine or a lathe.

BRIEF DESCRIPTION OF THE DRAWINGS

Hereinafter, preferred examples embodiments of the invention will be described in detail while reference is made to the accompanying drawing, wherein:

FIGS. 7 to 11 are different positions of the arm of the handling assembly as seen from the horizontal rail assembly.

DETAILED DESCRIPTION

Hereinafter, a handling assembly 1 and a machine tool assembly 100 according to a first example embodiment of the invention will be described in detail, while referring to FIGS. 1 to 14.

Figure 1:
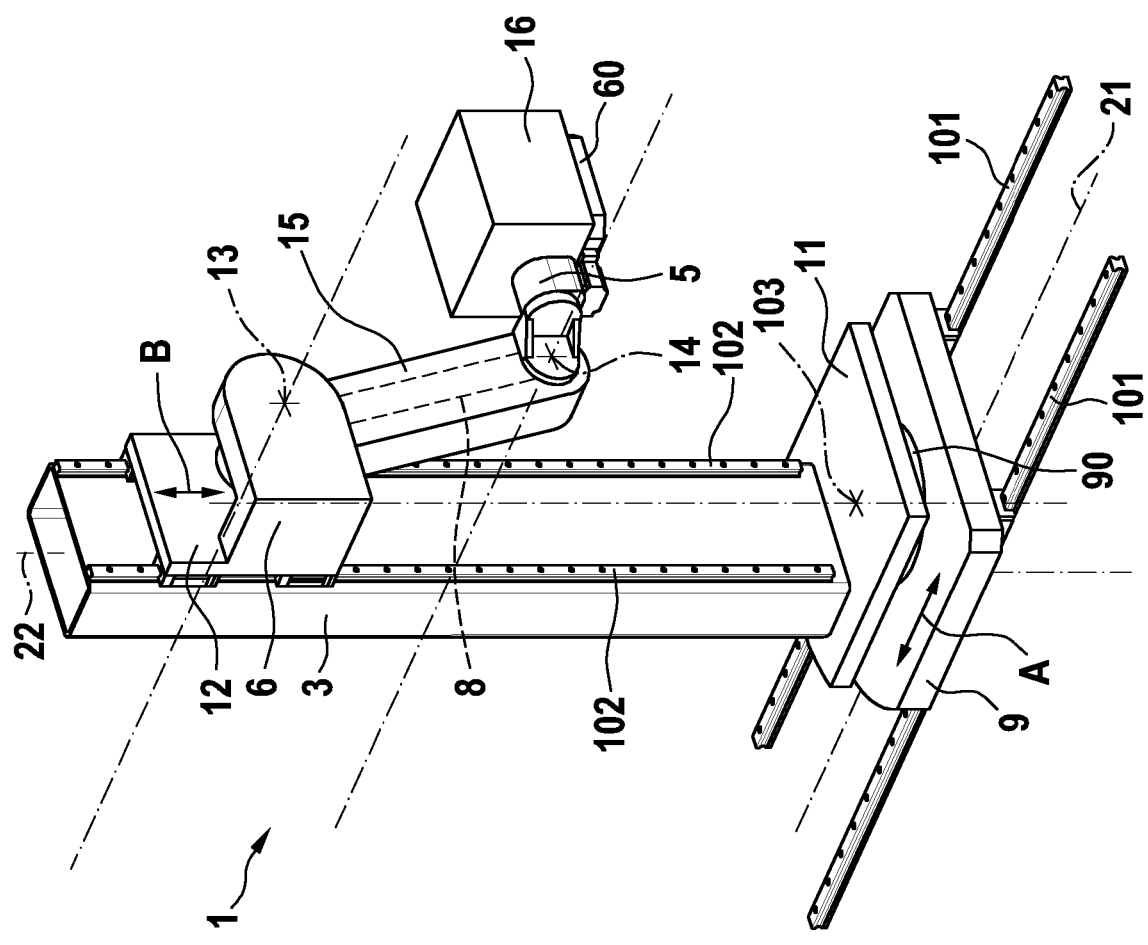
FIG. 1 is a schematic, perspective view of a handling assembly according to a first preferred example embodiment of the invention in a first position.

As may be seen from FIG. 1, the handling assembly 1 comprises a horizontal rail assembly 101 on which a horizontal carriage 9 is movable along a horizontal axis 21.

The horizontal rail assembly 101 comprises two rails arranged parallel to each other. Furthermore, the handling assembly comprises a tower 3 with a central axis 22 in vertical direction B, which is arranged on the horizontal carriage 9 by means of a base plate 11. In order to move the horizontal carriage 9 together with the tower 3 in horizontal direction A, the horizontal carriage 9 has a drive which is not shown.

Furthermore, the handling assembly comprises a vertical rail assembly 102, which is arranged on the tower 3. As may be seen from FIG. 1, the vertical rail assembly 102 comprises two separate and parallel rails.

A vertical carriage 12 is movable in the vertical direction B on the vertical rail assembly 102. A single, one-piece, straight arm 15 is swivably arranged on the vertical carriage 12 by means of a holder 6. The rigid arm 15, which is free of joints, will thus be mounted to be swiveled about a first swivel axis 13. The first swivel axis 13 is thereby arranged at a first end of the arm 15 and is stationary arranged on the vertical carriage 12. A second swivel axis 14 is also provided on the arm 15, on which a manipulator 5, which is designed as a gripper, is swivably arranged. Pallets 60 with workpieces 16 or tools not shown can be retained on the manipulator 5.

The first swivel axis 13 is parallel to the second swivel axis 14. Furthermore, the two swivel axes 13, 14 are arranged perpendicular to the vertical center axis 22.

A forced coupling unit 8 is arranged inside the arm 15. The forced coupling unit 8 between the first swivel axis 13 and the second swivel axis 14 will thus be arranged to keep the manipulator 5 horizontally aligned in each swivel position of the arm 15.

FIGS. 1 to 4 show three different swiveled states of the arm 15.

Figure 2:
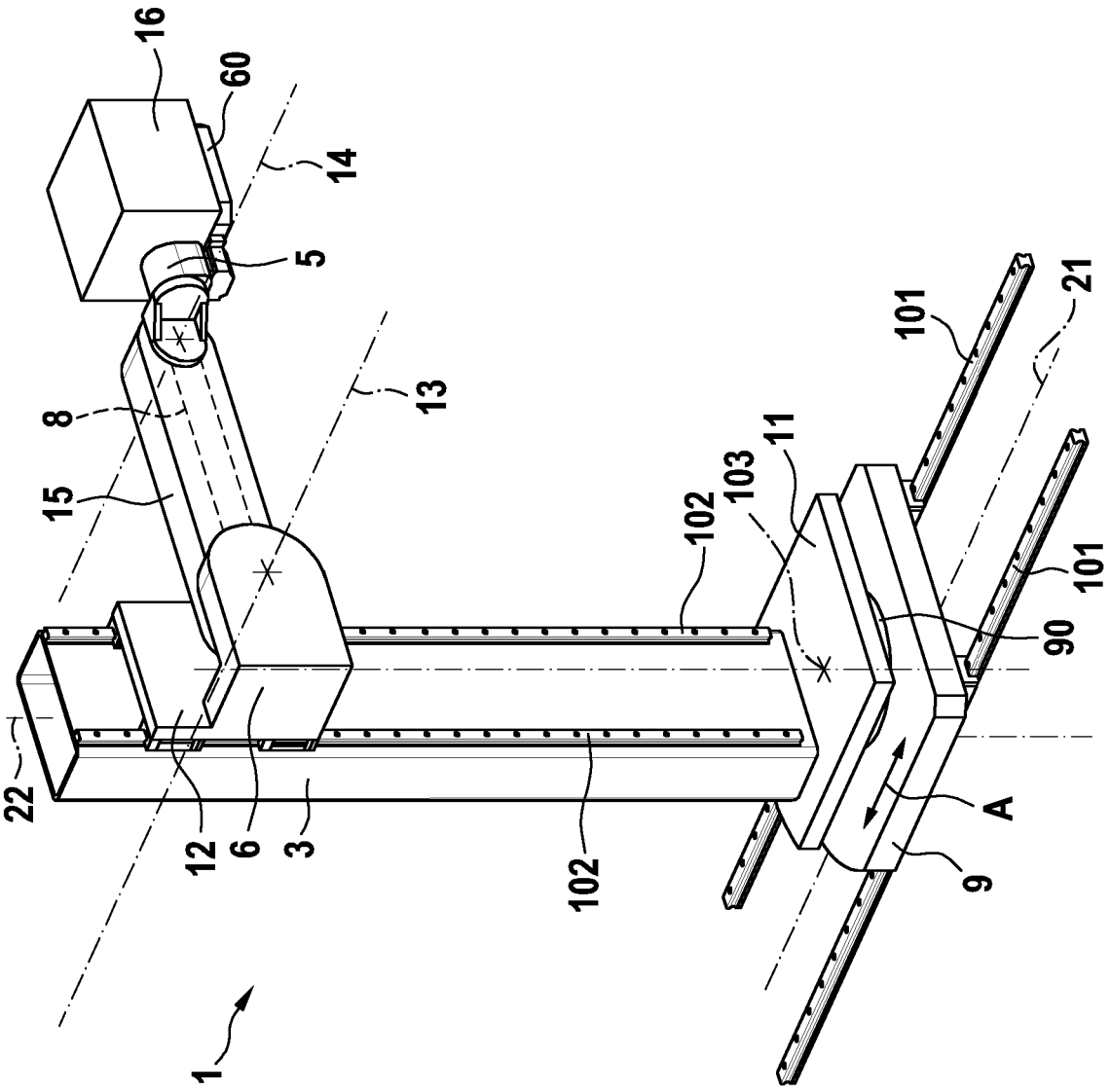
FIG. 2 is a schematic, perspective view of the handling assembly of FIG. 1 in a second position.

FIG. 2 shows a swiveled state in which the arm 15 is completely horizontally aligned. This is the position of manipulator 5 furthest away from tower 3. This is also shown in the top view of FIG. 13.

Figure 3:
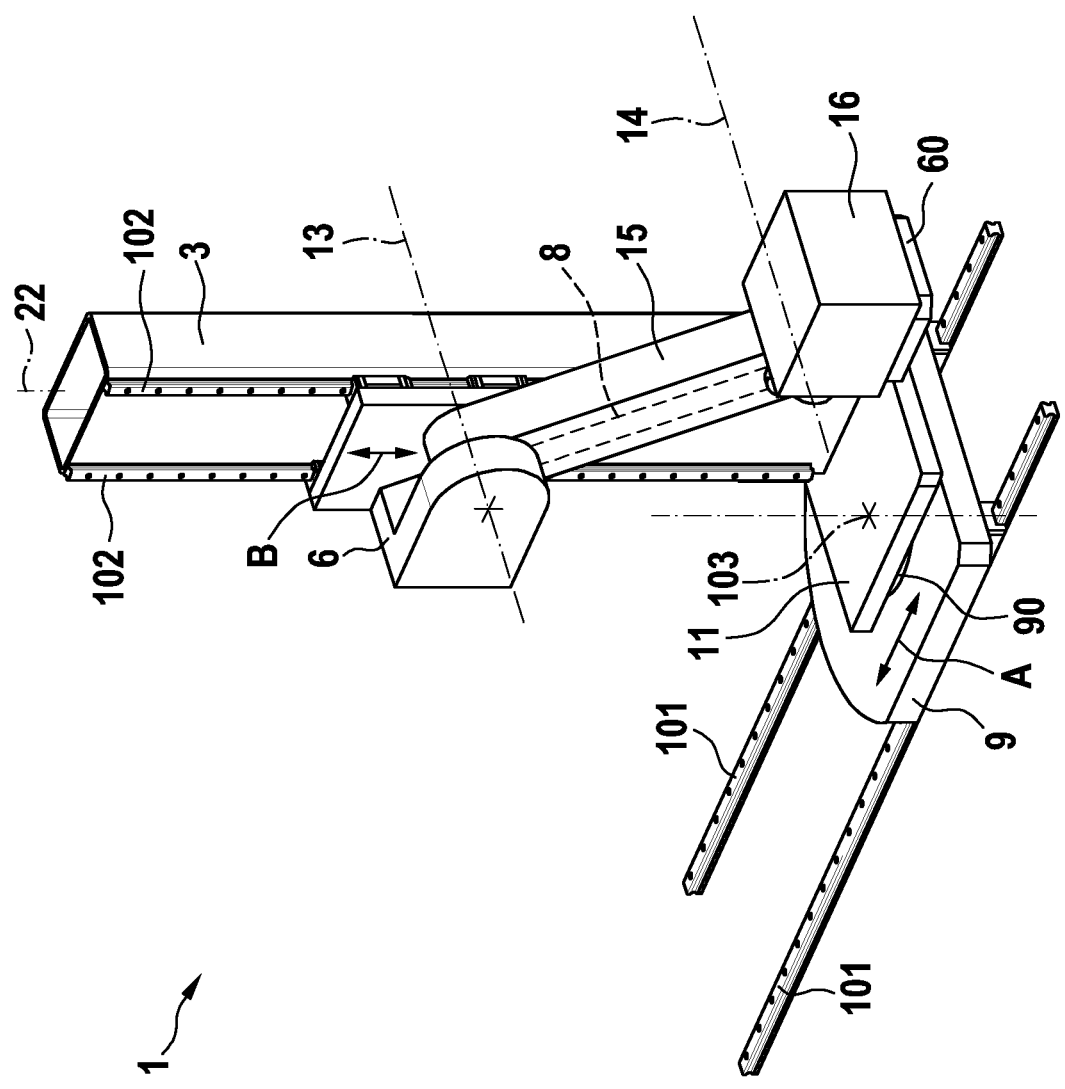
FIG. 3 is a schematic, perspective view of the handling assembly of FIG. 1 in a third position.

FIG. 3 shows a state in which the arm 15 is swiveled to a lower position. In addition, the base plate 11 is in another swivel position (rotated 90° to the right) about the vertical, third swivel axis 103 to the horizontal carriage 9.

FIG. 1 shows a middle position of the arm 15.

Figure 4:
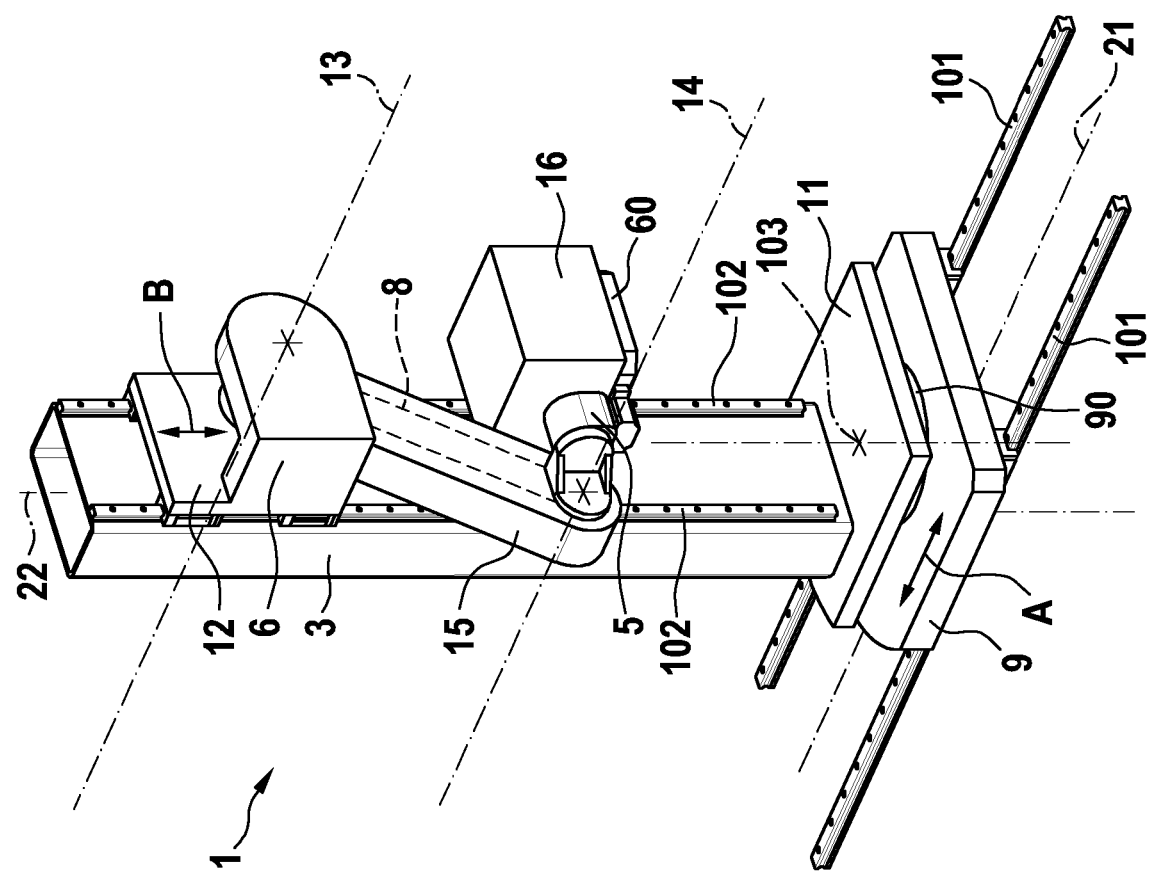
FIG. 4 is a schematic, perspective view in a fourth, very compact position.

FIG. 4 shows a position of the arm 15 in which particularly compact handling is possible. This position is particularly preferably assumed during a travel operation on the horizontal rail assembly 101 or during a swivel operation of the base plate 11 with tower 3 about the third swivel axis 103 and is hereinafter referred to as the first end position.

Thus, as is clear from FIGS. 1 to 4, the arm 15 can be moved to different positions by simply being swiveled about the first swivel axis 13. A drive is provided at the first swivel axis 13 to realize movement of the arm 15. No drive needs to be provided at the second swivel axis 14, which is forcibly coupled to the first swivel axis 13.

To illustrate the compactness of the handling assembly 1, reference is again made to FIGS. 7 to 11, which show a movement of the handling assembly from a first end position (FIG. 7) to a second end position (FIG. 11).

Figure 12:
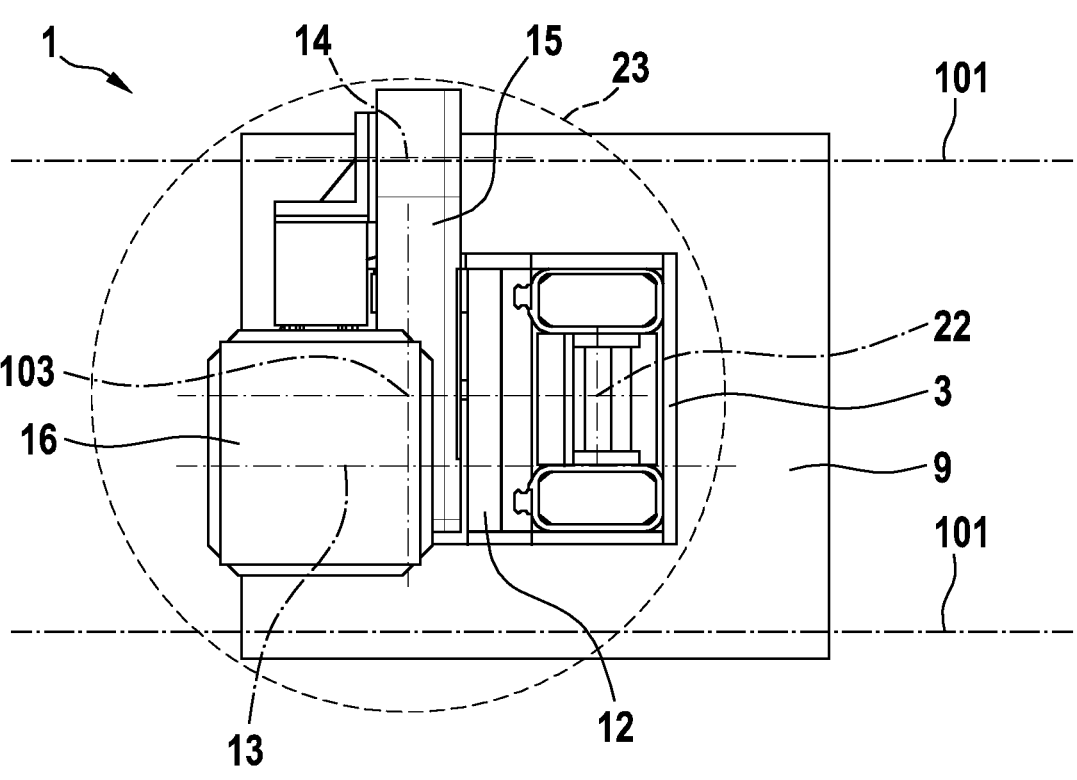
FIG. 12 is a top view of the handling assembly in a first position of the arm.
Figure 13:
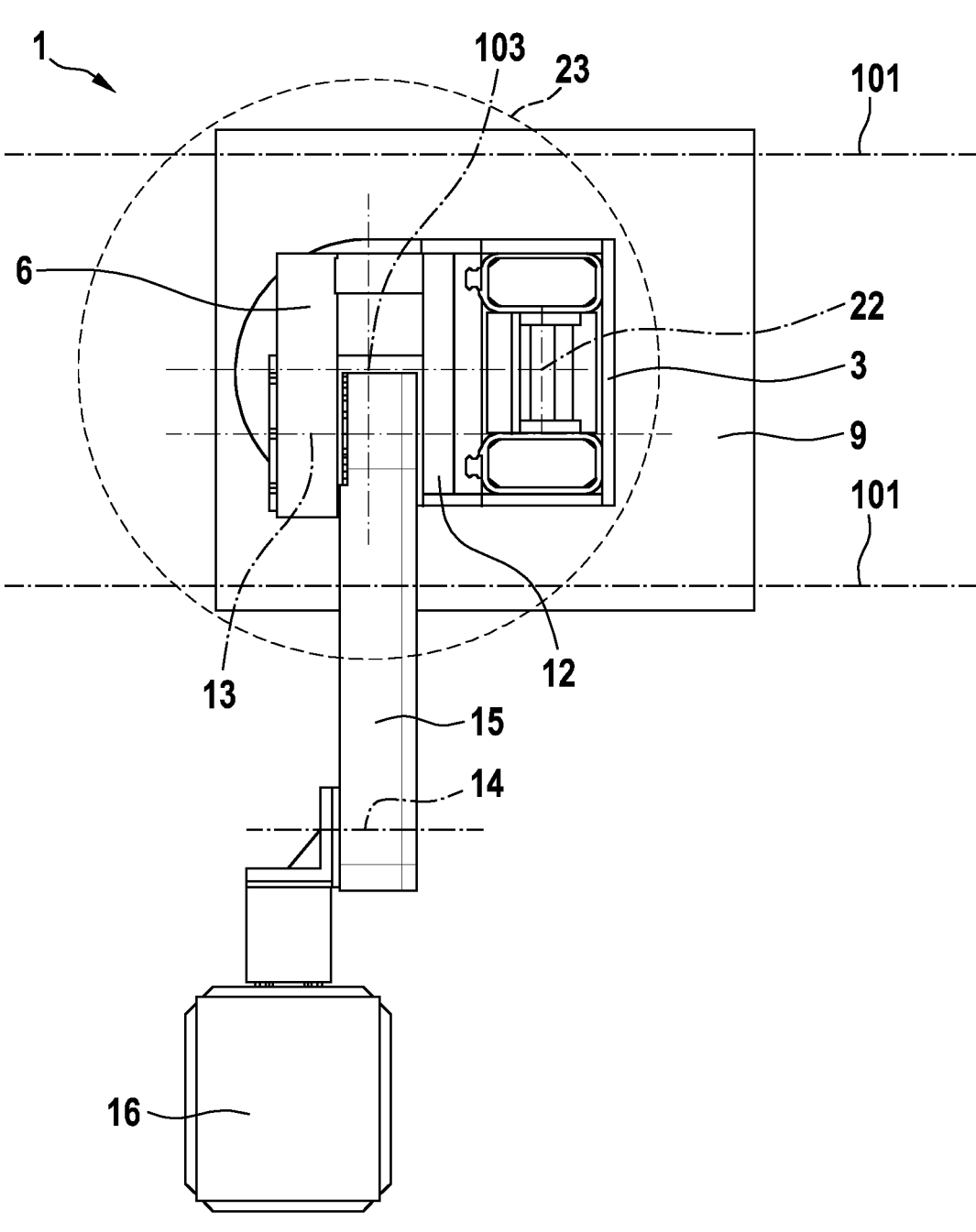
FIG. 13 is a top view of the handling assembly in a second position of the arm.

FIGS. 12 and 13 show two corresponding top views of the handling assembly 1 from above in two different positions. Herein, an interference area 23 is also shown upon rotation about the vertical third swivel axis 103, which interference area is exhibited by the handling assembly 1 in the maximally compact position.

Figure 7:
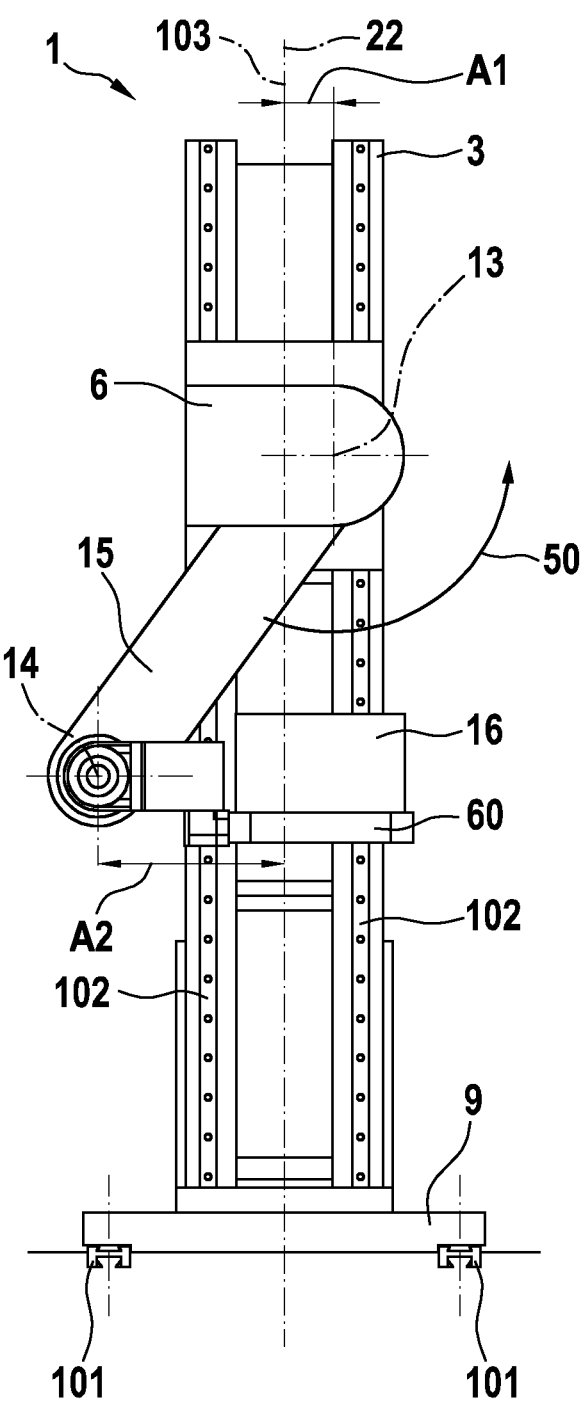

FIG. 7, as seen in the direction of the horizontal rail assembly 101 corresponding to FIG. 4, shows the first end position of the arm 15 for especially compact handling. As may be seen from FIG. 7, the first swivel axis 13 herein is arranged on the tower 3 on a first side of the third swivel axis 103 at a distance A1. Herein, the first swivel axis 13 is arranged between the third swivel axis 103 and one of the rails of the vertical rail assembly 102. In this view, the third swivel axis 103 and the center axis 22 overlap. Thus, the first swivel axis 13 is arranged to the right of the vertical third swivel axis 103.

The second swivel axis 14 is arranged on a second side of the third swivel axis 103 in the first end position and is spaced apart from the third swivel axis 103 by a distance A2. Thereby, the second distance A2 is greater than the first distance A1. As may be seen from FIG. 7, the second swivel axis 14 is located outside the tower 3 in the first end position. Thus, in the first end position, the second swivel axis 14 is to the left of the vertical third swivel axis 103. In this first end position, the very small interference area 23 shown in FIG. 12 results. This interference area 23 only minimally projects above the rails of the horizontal rail assembly 101.

Figure 11:
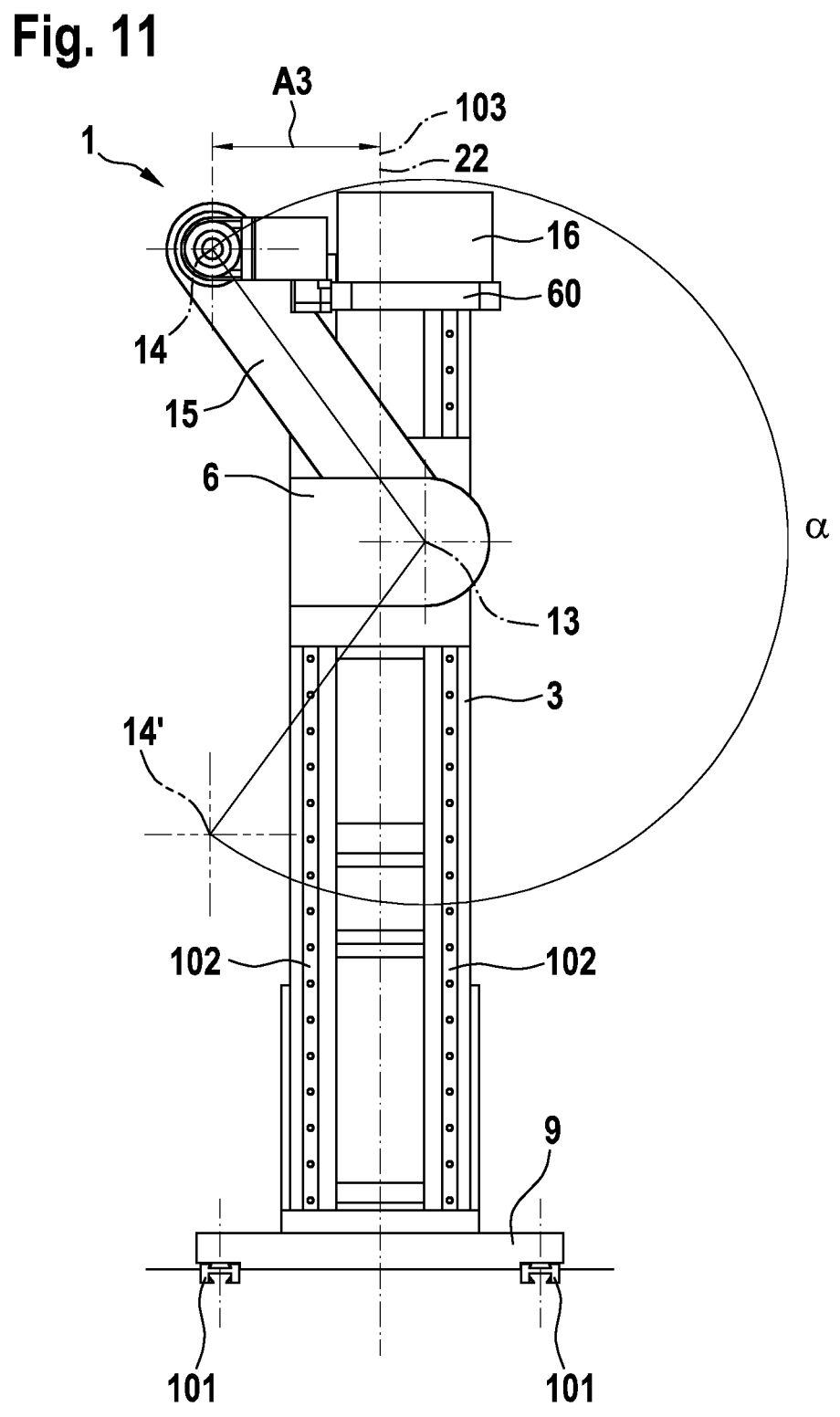

FIG. 11 shows the second end position of the handling assembly, in which the one-piece arm 15 is swiveled 2400 about the first swivel axis 13, starting from the first end position. The first end position is shown in FIG. 11 with the reference number 14'. In the second end position, the second swivel axis 14 is spaced apart from the third swivel axis 103 by a distance A3 on the second side. The first and second end positions are preferably vertically superimposed.

Figure 8:
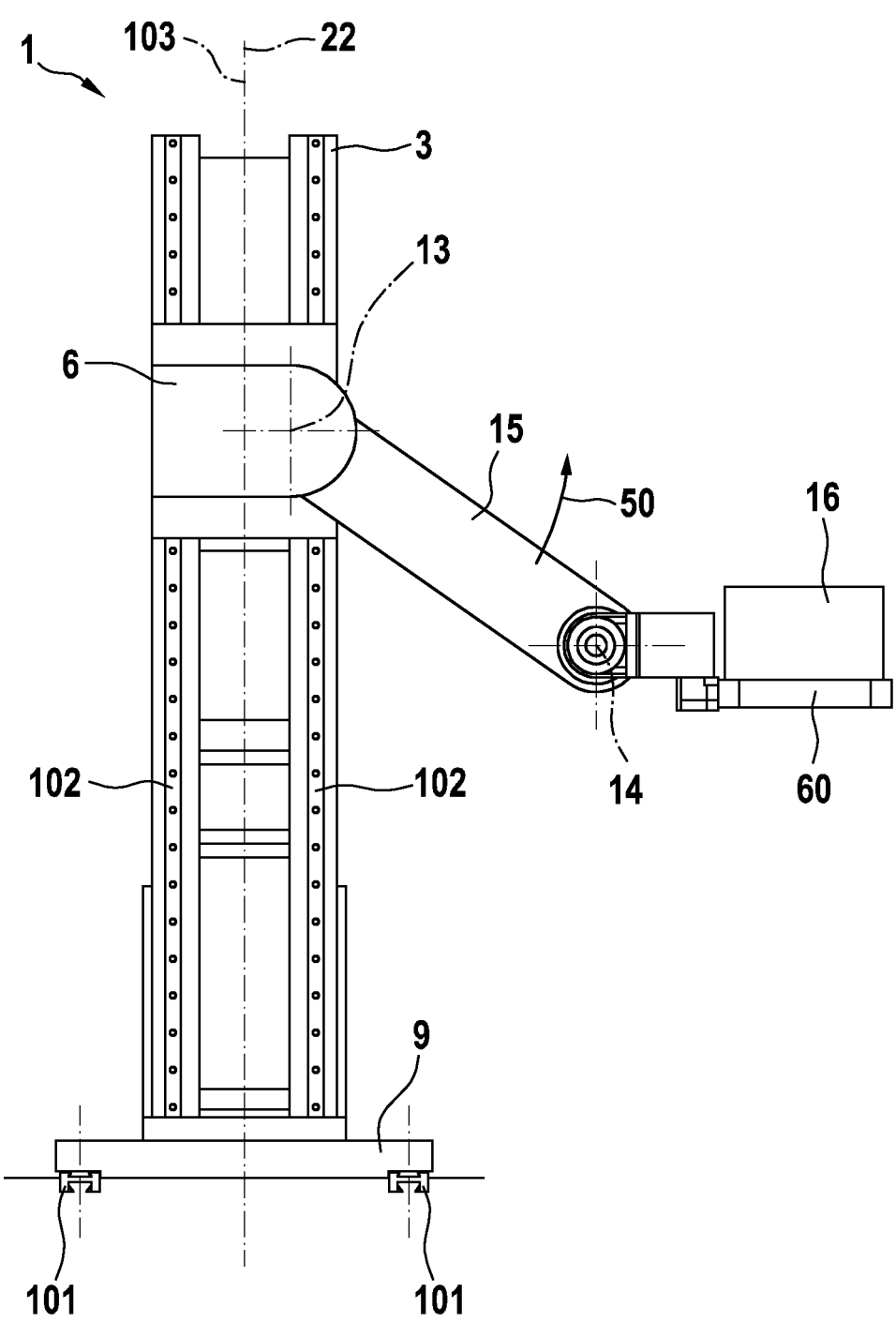
Figure 9:
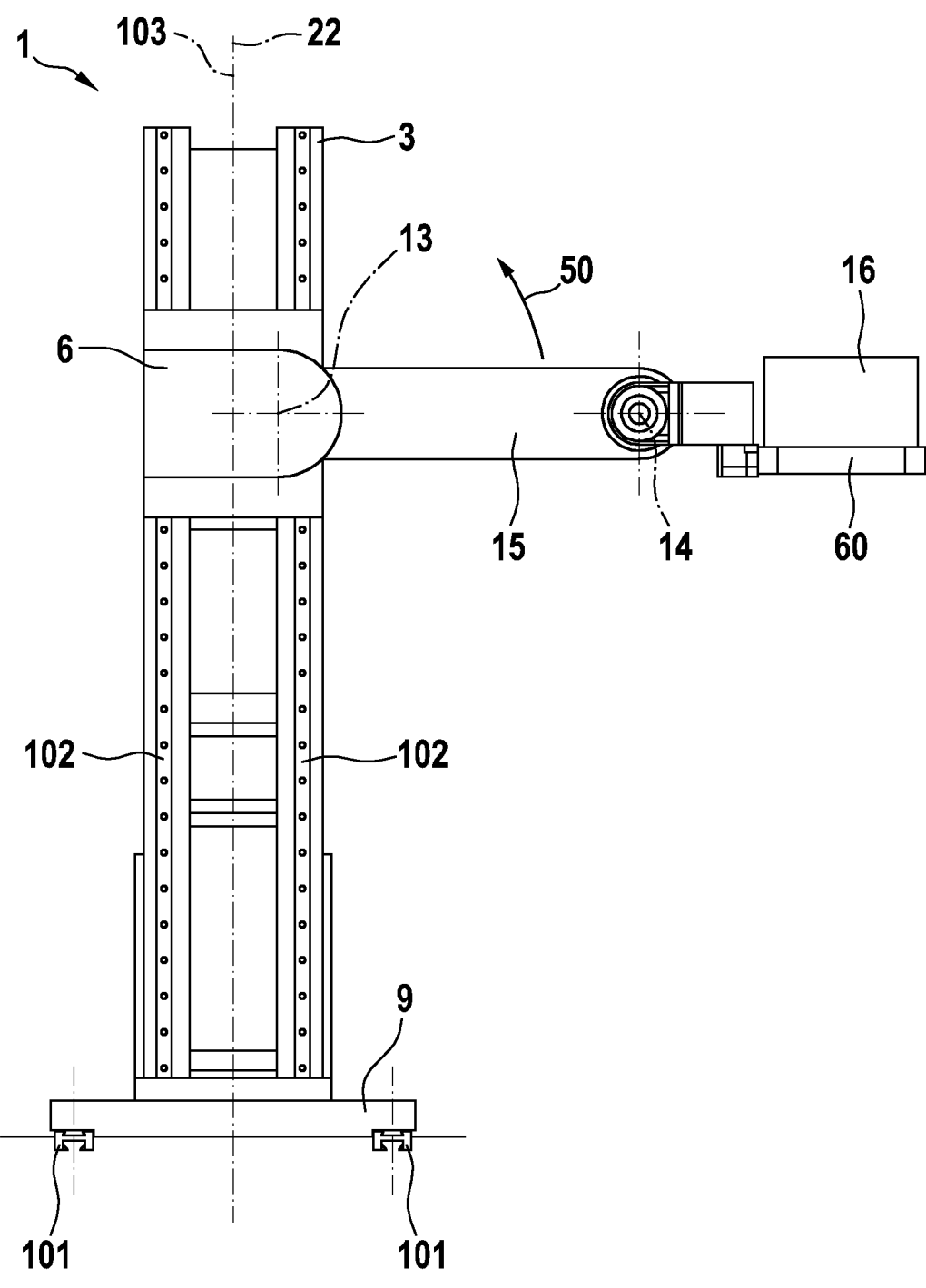
Figure 10:
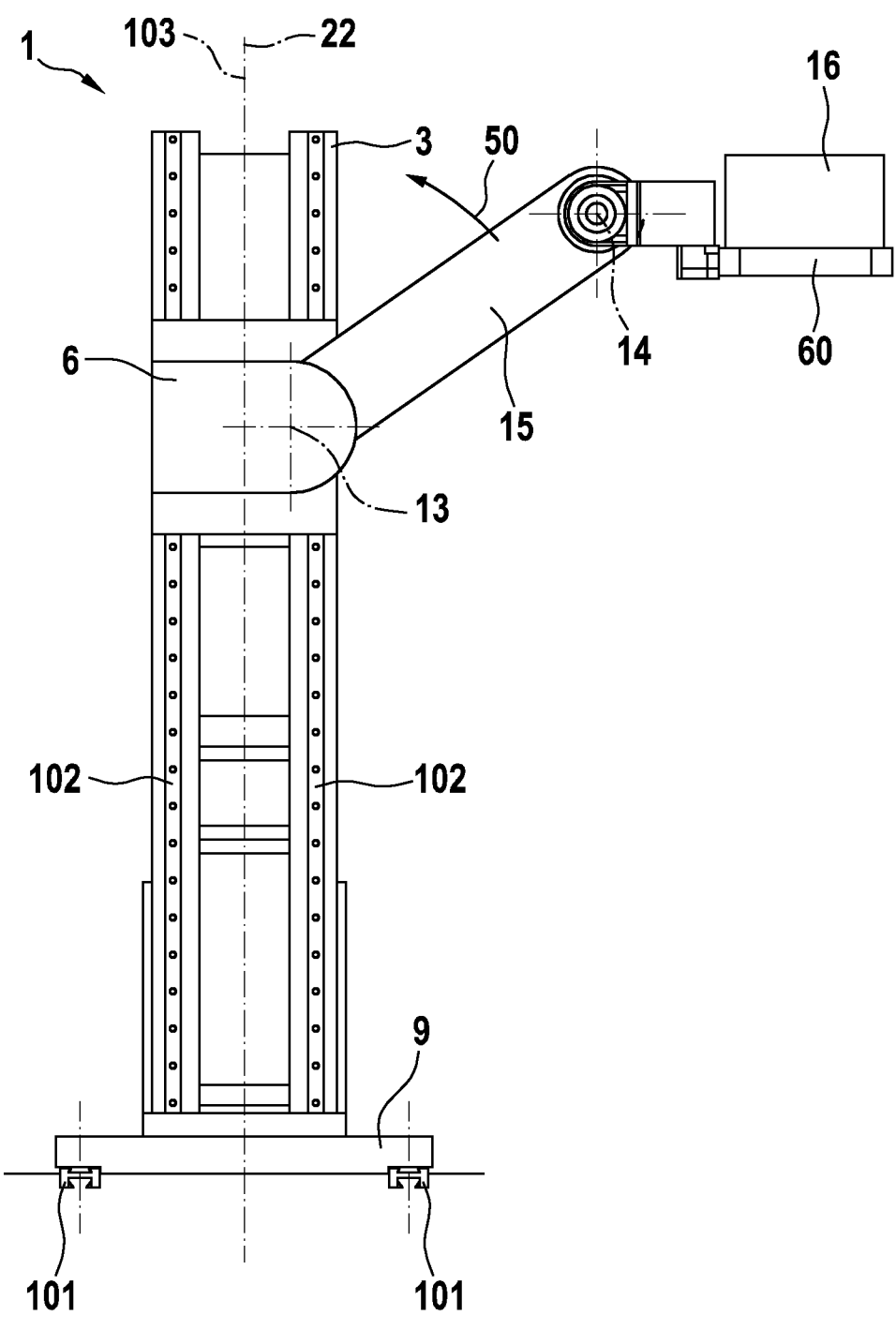

Due to the forced coupling between the first swivel axis 13 and the second swivel axis 14, a workpiece 16 can thereby remain aligned in the horizontal direction during the entire travel process from the first end position to the second end position. This is illustrated in FIGS. 8, 9 and 10, with FIG. 9 showing the one-piece arm 15 in a maximally extended state. In this position, for example, the workpiece 16 is positioned in a machine. FIGS. 8 and 10 each show intermediate positions between the fully extended position of FIG. 9 and the two end positions in FIGS. 7 and 11. Thus, in the two end positions (FIG. 7 and FIG. 11) of the one-piece arm 15, a very compact assembly of the workpiece 16 can be realized, for example for a traveling operation. In this case, the arm 15 may be designed as a one-piece linear arm in a very simple manner, at the respective two ends of which one of the first and second swivel axes 13, 14 is arranged. The first swivel axis 13 is fixed to the vertical carriage 12. In this example embodiment, the one-piece arm 15 can be swiveled through an angle α of 240° about the first swivel axis 13. Due to off-center positioning of the first swivel axis 13 on the tower 3, positioning of the one-piece arm 15 together with the workpiece 16 that occupies a small amount of installation space may thus be achieved in the end positions.

Starting from the first end position in FIG. 7, the swivel operation is illustrated in FIGS. 7 to 11 by the arrow 50 in each case. Swiveling back from the second end position to the first end position is possible in the respective opposite direction.

The tower 3 can further be swiveled on the horizontal carriage 9 about the vertical, third swivel axis 103, which extends in the vertical direction. This allows the manipulator 5 to reach all positions on both sides of the horizontal rail assembly 101. The base plate 11, on which the tower 3 is arranged, is thereby swivel-mounted by at least 180° about the vertical, third swivel axis 103, which is arranged parallel to the central axis 22.

As may further be seen from FIG. 1, the central axis 22 of the tower 3 and the third swivel axis 103 diverge. This allows the arm 15 to lie in the third swivel axis 103, resulting in a particularly compact design, as can also be seen from FIG. 12.

As it is also clear from FIGS. 7 to 11, the first swivel axis 13 is also always arranged to the right of the vertical third swivel axis 103. The second swivel axis 14 is arranged to the left of the vertical third swivel axis 103 in the first and second end positions. When the arm 15 moves from the first to the second end position, the second swivel axis then moves to the right side of the third swivel axis 103.

The arm 15 is fixed to the vertical carriage 12 by means of the holder 6. In this example embodiment, the holder 6 is L-shaped, but may also have a different design.

Thus, the handling assembly 1 for travelling has a drive at the horizontal rail assembly 101, a drive at the vertical rail assembly 102 and a drive at the first swivel axis 13. Furthermore, a drive (not shown) is provided at the vertical, third swivel axis 103, the tower 3 on the base plate 11 being mounted to be swiveled therearound in relation to the horizontal carriage 9 by means of a bearing 90.

The manipulator 5 can thus be moved to all positions within a 3600 radius about the vertical, third swivel axis 103 and the first swivel axis 13 by moving the carriages in the horizontal direction A and vertical direction B and swiveling around the vertical, third swivel axis 103. During this operation, a workpiece 16 always remains in the horizontal position.

Figure 6:
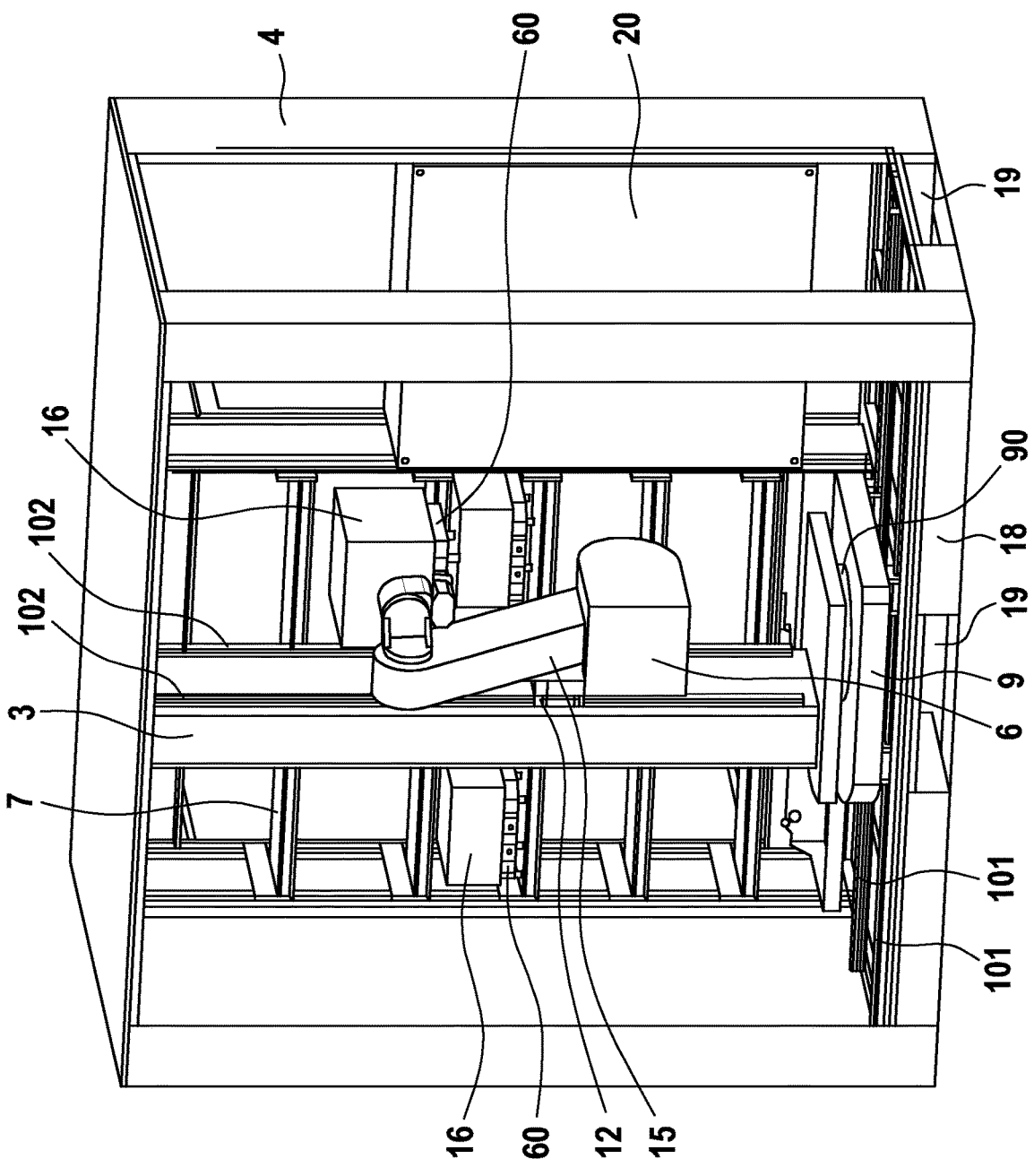
FIG. 6 is a perspective view of the handling assembly of FIG. 1 in a cabinet system.

FIG. 6 shows how the handling assembly 1 is installed in a cabinet 4. A shelf system 7 is arranged on a rear wall of the cabinet, on which pallets 60 with workpieces 16 and/or tools are arranged. The reference number 20 indicates a control cabinet with a control unit for the handling assembly 1. The horizontal rail assembly 101 is arranged on a floor 18 of the cabinet 4. The handling assembly 1 is thus movable inside the cabinet. Furthermore, recesses 19 are provided in the floor 18 of the cabinet, which serve an easy transport with a lift truck or forklift for the installation and, if necessary, are also provided as mechanical interfaces on the one hand to a machine (front recess) and on the other hand to a possible adjacent cabinet (side recess).

Figure 5:
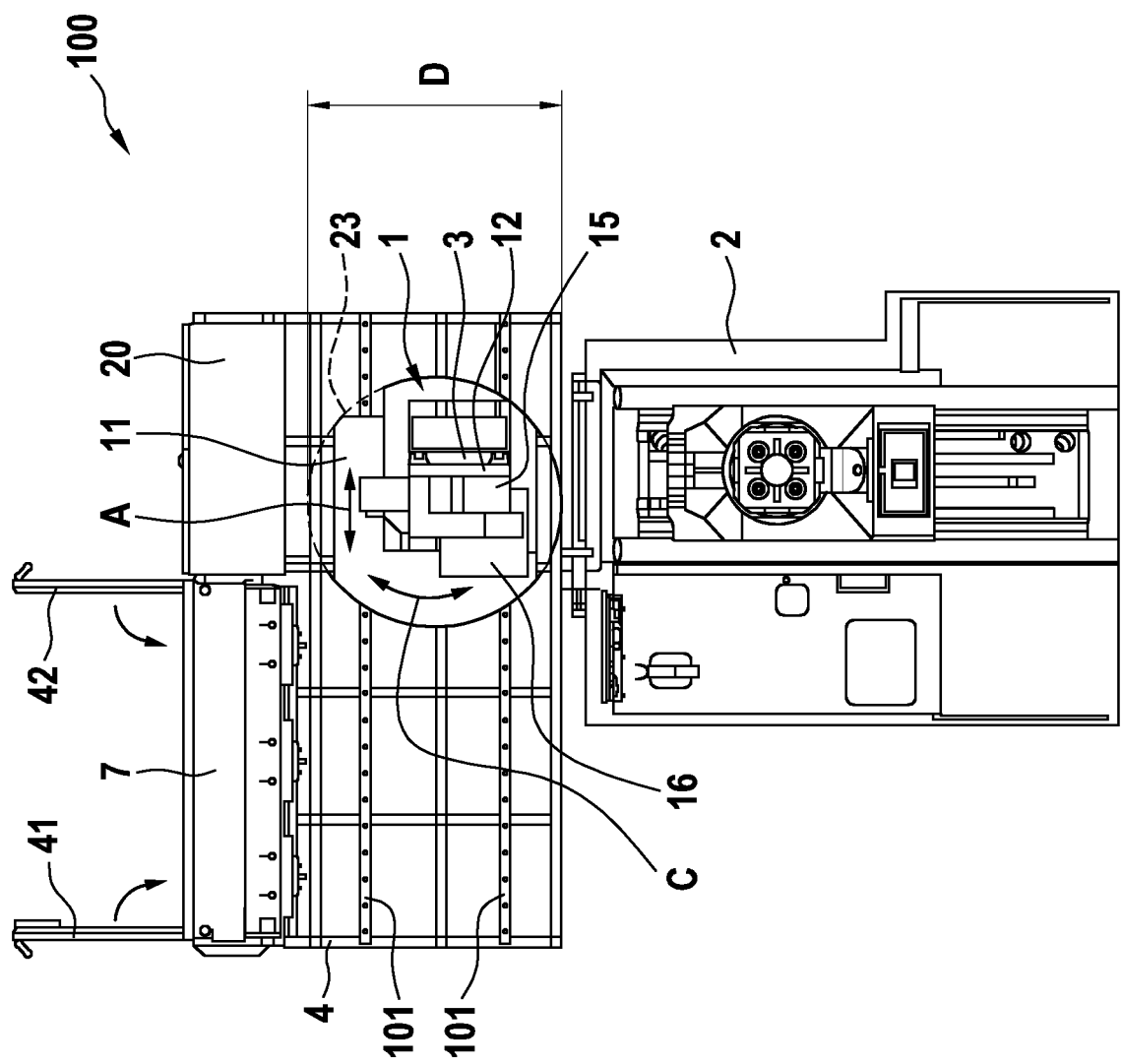
FIG. 5 is a schematic top view of a machine tool assembly with a machine tool and a handling assembly according to FIGS. 1 to 4.

The assembly of the cabinet 4 in front of a machine tool 2 is shown in detail in FIG. 5. It therefrom becomes clear that a distance D between the shelf system 7 and the machine tool 2 is very small, since the handling assembly 1 can linearly move to the left and right on the horizontal rail assembly 101 within the cabinet 4 in front of the machine tool 2 and can rotate to the point about the vertical, third swivel axis 103 by at least 180° (arrow C in FIG. 5). In this case, the interference area 23 is very small. In this respect, the handling assembly 1 has a very simple and compact design that allows rotation in a very small space with pallet 60 and workpiece 16, as is clear from FIG. 4.

FIG. 5 also shows that the cabinet 4 may have doors 41, 42, for example, to perform replacement of new workpieces and/or replacement of tools in the cabinet 4 from the side on the shelf system 7 facing away from the handling assembly 1.

Figure 14:
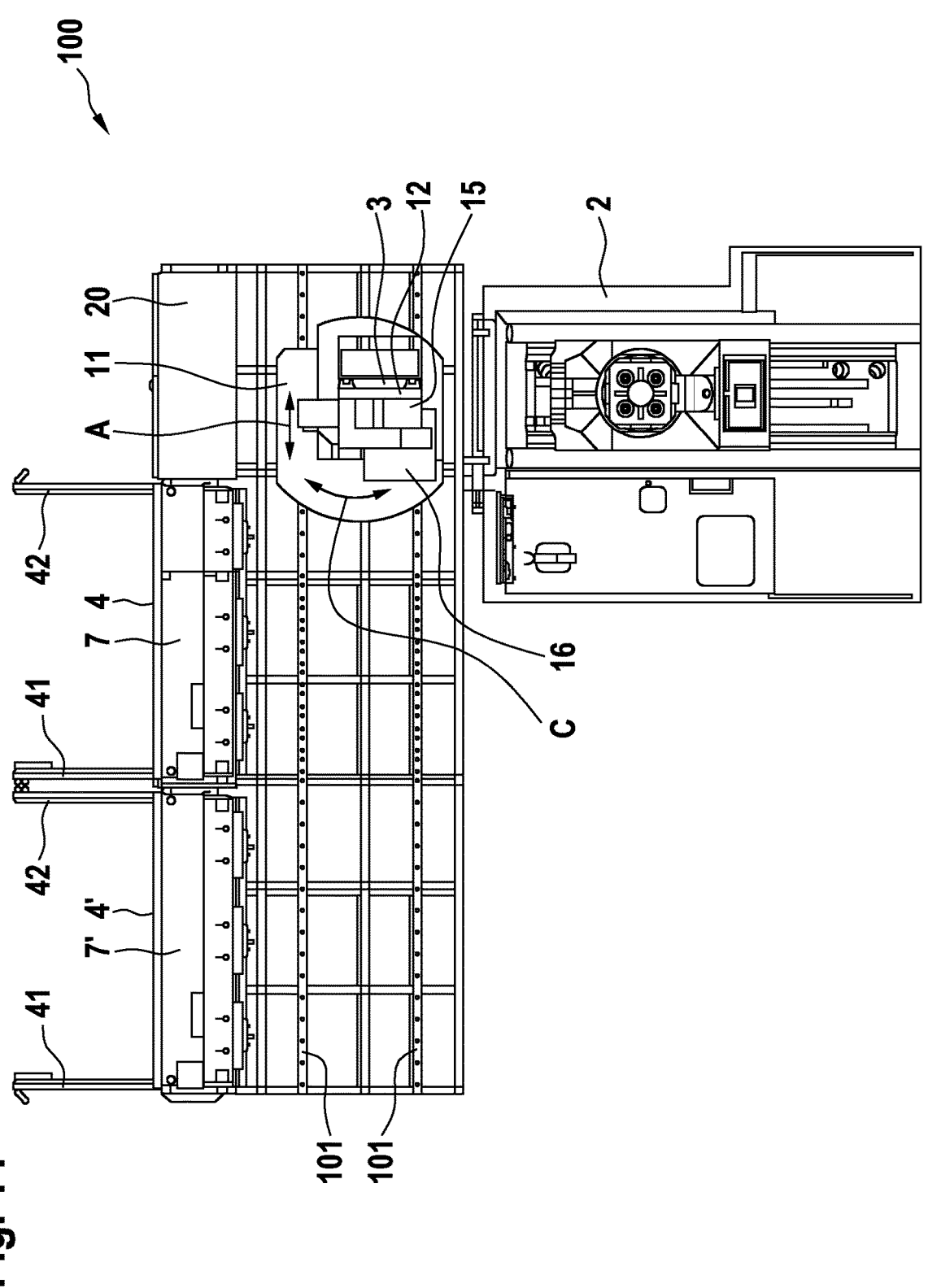
FIG. 14 is an alternative top view of a machine tool assembly with multiple cabinet systems.

FIG. 14 shows an alternative design of a machine tool assembly 100, in which a second cabinet 4' is provided in addition to a first cabinet 4. This clearly illustrates the modular design of the machine tool assembly 100. It should be pointed out that, of course, a plurality of machine tools 2 can also be arranged in series and a plurality of cabinet systems 4 can be positioned in front of a plurality of machine tools 2. In this case, the respective horizontal rail assemblies 101, in the assembled state, form a common rail assembly on which the handling assembly 1 is linearly unit 20 may be provided for all shelf systems 7 and machine tools 2.

Thus, all components of the handling assembly 1 can be installed in one cabinet 4 and this can be completely assembled, tested in the manufacturing factory and put into operation even before delivery to a customer. Additional cabinets 4' may be added to the first cabinet 4 in a quick and easy manner. In this case, a common horizontal rail assembly 101 extending through all cabinets 4 and 4' will then be provided, but only a single handling assembly 1 will be present in the first cabinet 4. The handling assembly 1 can travel into the attached cabinets 4' on the common rail assembly 101. In a simple manner, mechanical connection aids can be provided in this case to be able to implement the modular design in a quick and simple manner.

Figure 15:
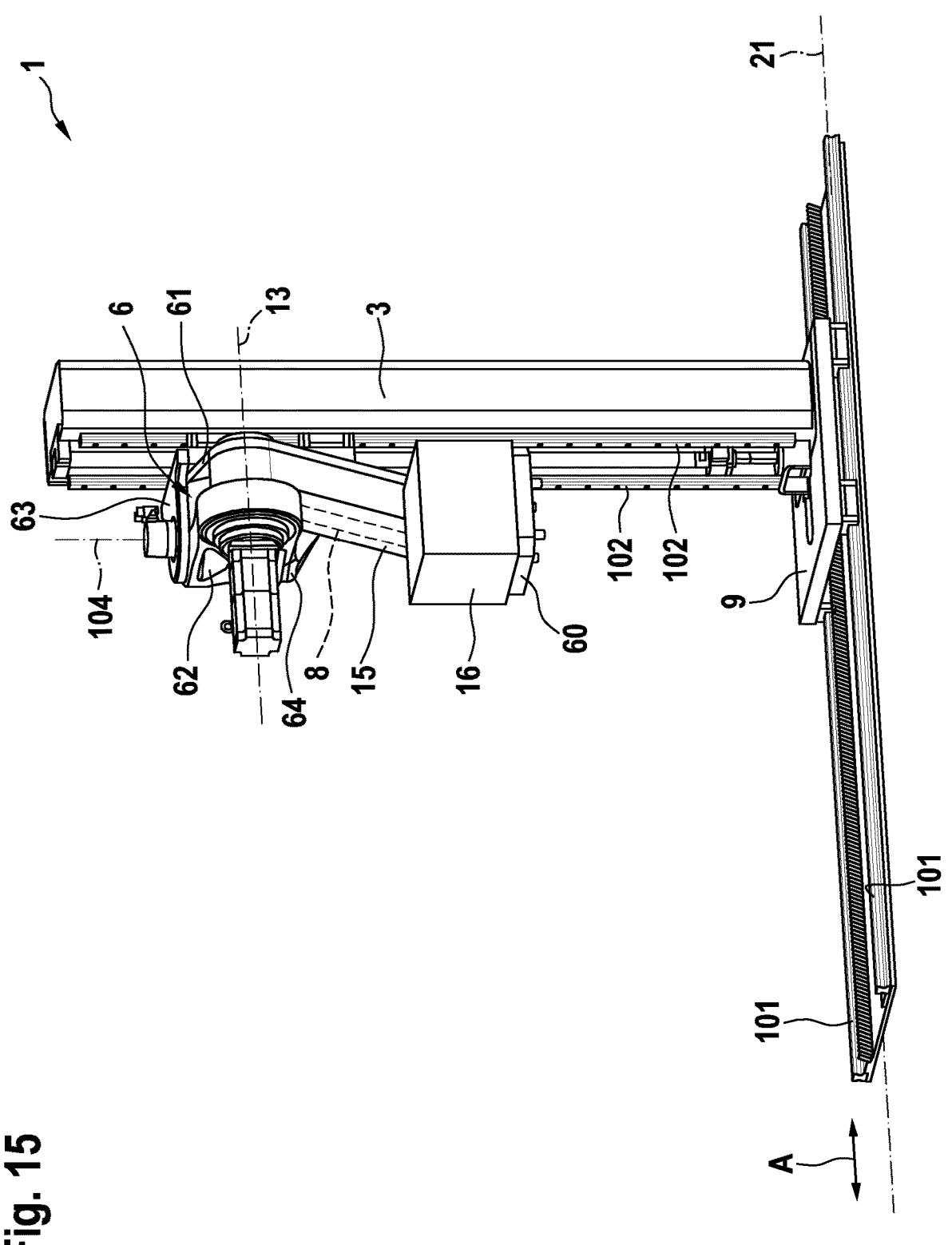
FIGS. 15 and 16 are perspective views of a handling assembly according to a second example embodiment of the invention as seen from different perspectives.
Figure 16:
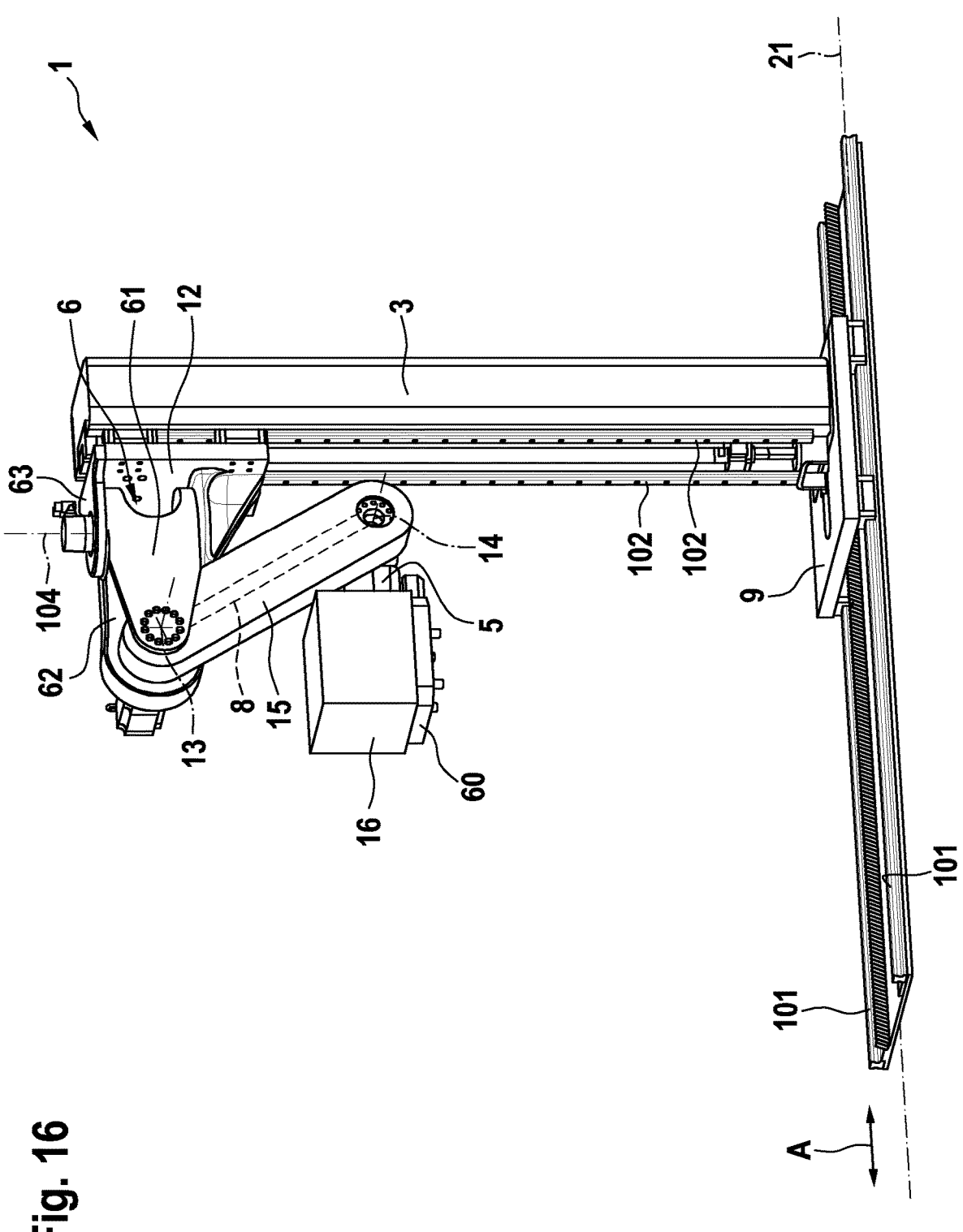

FIGS. 15 and 16 show a handling assembly 1 according to a second example embodiment of the invention. Identical or functionally identical parts are designated with the same reference numbers.

As may be seen from FIG. 15, contrary to the first example embodiment, in the second example embodiment the tower 3 is stationary fixed on the horizontal carriage 9. The tower 3 is arranged off-center on the horizontal carriage 9. Thus, the tower 3 itself is not rotatable. However, another vertical fourth swivel axis 104 is provided on the holder 6, which is mounted on the vertical carriage 12. A first and a second holding plate 61 and 62 can be swiveled about the vertical swivel axis 104. The arm 15 is held between the holding plates 61 and 62. The horizontal first swivel axis 13 passes through the holding plates 61 and 62, and the arm 15 can be swiveled about this first swivel axis 13 as in the first example embodiment. The vertical swivel axis 104 is perpendicular to the horizontal axis 21. A third and fourth horizontal holding plate 63 and 64 receive the first and second vertical holding plates 61, 62 therebetween and swivel-mounted about the swivel axis 104. The third and fourth horizontal holding plates 63, 64 are fixed to the vertical carriage 12. According to the second example embodiment, the handling assembly 1 can be provided with a smaller and compact vertical swivel axis 104 than in the first example embodiment and also builds very compactly. It should be pointed out that it is also possible for the tower 3 to swivel about a third swivel axis 103 in accordance with the first example embodiment. Otherwise, this example embodiment corresponds to the preceding example embodiment, so that reference can be made to the description given therein.

Various features of the invention are set forth in the following claims.

The invention claimed is:

1. A handling assembly for handling tools and/or workpieces of a machine tool, the handling assembly comprising:
   a horizontal rail assembly;
   a vertical tower arranged on the horizontal rail assembly and movable in a direction of a horizontal axis;
   a vertical rail assembly arranged on the vertical tower;
   a vertical carriage movable on the vertical rail assembly in a vertical direction;
   exactly one one-piece rigid arm, which is arranged on the vertical carriage and is swivel-mounted about a horizontal, first swivel axis on the vertical carriage; and
   a manipulator, which is arranged on the arm and swivel-mounted about a horizontal, second swivel axis on the arm;
   wherein the arm is swivel-mounted about a vertical swivel axis, wherein the first swivel axis is parallel to the second swivel axis, and
   wherein the first swivel axis is arranged at a first side of the vertical swivel axis in a first distance from the vertical swivel axis.

2. The handling assembly according to claim 1, wherein the vertical swivel axis is a third swivel axis, the tower being mounted to be swiveled thereabout.

3. The handling assembly according to claim 2, wherein a central axis of the tower and the third swivel axis diverge and are parallel to each other.

4. The handling assembly according to claim 1, wherein the second swivel axis is arranged in a first end position on a second side of the vertical swivel axis opposite the first side with a second distance.

5. The handling assembly according to claim 4, wherein the second swivel axis is arranged in a second end position on the second side of the vertical swivel axis opposite the first side with a third distance.

6. The handling assembly according to claim 4, wherein the vertical swivel axis intersects the arm in the first and/or second end position.

7. The handling assembly according to claim 1, wherein the one-piece rigid arm is swivel-mounted about the first swivel axis at an angle ($\alpha$) of $\geq 180°$.

8. The handling assembly according to claim 1, wherein a forced coupling unit is provided between the first swivel axis and the second swivel axis, which is arranged to keep the manipulator horizontally aligned in any swivel position of the arm.

9. The handling assembly according to claim 8, wherein the first swivel axis is drivable by a drive.

10. The handling assembly according to claim 8, wherein the forced coupling unit comprises a chain drive or a belt drive.

11. The handling assembly according to claim 1, wherein the tower is arranged on a horizontal carriage, wherein the horizontal carriage is movable on the horizontal rail assembly in the direction of the horizontal axis.

12. The handling assembly according to claim 11, wherein a base plate is rotatably arranged on the horizontal carriage, and wherein the tower is fixed on the base plate (11).

13. The handling assembly according to claim 1, wherein the arm is attached to the vertical carriage via a first and second vertical holding plate of a holder.

14. The handling assembly according to claim 1, further comprising a shelf system, in which the workpieces and/or tools are stored.

15. The handling assembly of claim 1, wherein the vertical swivel axis is a fourth swivel axis, the arm on the vertical carriage being mounted to be swiveled thereabout.

16. The handling assembly of claim 1, further comprising a shelf system, in which a single handling assembly is integrated in a cabinet together with the shelf system.

17. A machine tool assembly, comprising at least one machine tool and a handling assembly according to claim 1.

* * * * *